United States Patent
Gruijters et al.

(10) Patent No.: US 7,826,567 B2
(45) Date of Patent: Nov. 2, 2010

(54) METHOD AND APPARATUS FOR COARSE AND FINE FREQUENCY AND TIMING SYNCHRONISATION

(75) Inventors: Paulus Wilhelmus Franciscus Gruijters, Eindhoven (NL); Lucas Hendrikus Gerardus Tan, Eindhoven (NL)

(73) Assignee: NXP B.V., Eindhoven (NL)

( * ) Notice: Subject to any disclaimer, the term of this patent is extended or adjusted under 35 U.S.C. 154(b) by 1325 days.

(21) Appl. No.: 10/563,926

(22) PCT Filed: Jul. 6, 2004

(86) PCT No.: PCT/IB2004/051133

§ 371 (c)(1),
(2), (4) Date: Jan. 9, 2006

(87) PCT Pub. No.: WO2005/006697

PCT Pub. Date: Jan. 20, 2005

(65) Prior Publication Data

US 2006/0233288 A1 Oct. 19, 2006

(30) Foreign Application Priority Data

Jul. 11, 2003 (EP) .................................. 03102122

(51) Int. Cl.
*H04L 27/28* (2006.01)
*H04L 27/26* (2006.01)
*H04L 7/00* (2006.01)
*H04L 7/04* (2006.01)
*H04L 7/06* (2006.01)
*H03D 1/00* (2006.01)
*H04J 11/00* (2006.01)
*H04J 3/06* (2006.01)

(52) U.S. Cl. ............ 375/343; 375/260; 375/344; 375/345; 375/346; 375/355; 375/362; 375/364; 375/365; 375/366; 370/509; 370/510; 370/511; 370/512; 370/513; 370/514

(58) Field of Classification Search ............... 375/202, 375/260, 343, 346–355, 362, 364, 365, 366; 370/203, 208, 480, 509–514
See application file for complete search history.

(56) References Cited

U.S. PATENT DOCUMENTS 6,137,847 A * 10/2000 Stott et al. ............... 375/344

(Continued)

FOREIGN PATENT DOCUMENTS

EP 1071251 * 1/2001

(Continued)

*Primary Examiner*—Mohammad H Ghayour
*Assistant Examiner*—Eboni Giles (57) ABSTRACT

Receivers (1) for receiving frequency signals are, to improve their time synchronization accuracy, provided with synchronization stages (20) for performing a coarse time synchronization through autocorrelating samples of a group of preamble symbols (t1,t2,t3) and a fine time synchronization through crosscorrelating samples of a further group of preamble symbols (t10,G1) with predefined samples. The synchronization stages (20) also perform a coarse and a fine frequency synchronization through detecting and accumulating phases of samples of a yet further group of preamble symbols (t8,t9) and of another group of preamble symbols (T1,T2). The synchronization stages (20) have buffering units (21) and controlling units (22) for controlling mixing units (11) and transformating units (12) in processing stages (10). The preamble symbols have ten short preamble symbols (t1-t10), a guard interval preamble symbol (G 1) and two training symbols (T 1,T2).

20 Claims, 3 Drawing Sheets

U.S. PATENT DOCUMENTS 6,754,170 B1 * 6/2004 Ward .......................... 370/208
7,286,617 B2 * 10/2007 Vanderperren et al. ...... 375/343
2002/0071509 A1 * 6/2002 Richards et al. ............. 375/355

FOREIGN PATENT DOCUMENTS

| WO | WO 0077961 | * | 12/2000 |
| WO | WO0077961 | * | 12/2000 |
| WO | WO 0191393 | | 11/2001 |

* cited by examiner

METHOD AND APPARATUS FOR COARSE AND FINE FREQUENCY AND TIMING SYNCHRONISATION

The invention relates to a receiver for receiving frequency signals, to a system comprising a receiver for receiving frequency signals, to a synchronization stage for use in a receiver for receiving frequency signals, to a method for receiving frequency signals, and to a processor program product for receiving frequency signals.

Examples of such a receiver are wireless modems, wireless interfaces for wireless networks like local area networks etc.

A prior art receiver is known from EP 1 071 251 A2, which discloses in its FIG. 11B an orthogonal frequency division multiplexing packet communication receiver comprising a carrier frequency offset compensation means for performing a frequency synchronization and comprising a timing detection means for performing a time synchronization. As described in its col. 3 lines 25-50, the time synchronization is difficult under multipath environments and/or under large noise environments.

This known receiver is disadvantageous, inter alia, because its time synchronization is relatively inaccurate.

It is an object of the invention, inter alia, to provide a receiver with a relatively accurate time synchronization.

Furthers objects of the invention are, inter alia, to provide a system comprising a processor and a receiver having a relatively accurate time synchronization, to provide a synchronization stage for use in a receiver having a relatively accurate time synchronization, and to provide a method and a processor program product for receiving frequency signals via a relatively accurate time synchronization.

The receiver according to the invention for receiving frequency signals comprises
- a processing stage for converting the frequency signals into baseband signals comprising preamble symbols and data symbols and for processing the baseband signals; and
- a synchronization stage for synchronising the processing stage and comprising a first part for performing a coarse time synchronization through autocorrelating samples of a group of preamble symbols and comprising a second part for performing a fine time synchronization through crosscorrelating samples of a further group of preamble symbols with predefined samples.

Compared to a prior art one-step time synchronization, a two-step time synchronization comprising the coarse time synchronization and the fine time synchronization will be more accurate. Due to the coarse time synchronization being based on one or more autocorrelations and the fine time synchronization being based on one or more crosscorrelations, new calculations are made for the fine time synchronization and the results of old calculations made for the coarse time synchronization are not used for the fine time synchronization. Therefore, both steps have become independent from each other. This results in an improved accuracy. Further, in case a frequency offset is present, in other words in case the coarse time synchronization is performed before a frequency synchronization is performed, the one or more autocorrelations give more reliable results compared to performing coarse time synchronization through one or more crosscorrelations.

It should be noted that EP 1 071 251 A2 discloses an improvement of its accuracy of its time synchronization by introducing a crosscorrelation output filter and by performing the time synchronization after the frequency synchronization. EP 1 071 251 A2 does not disclose a two-step time synchronization based on different correlations. Further, from WO 01/91393 A2, a receiver with a more-than-one-step time synchronization is known, by performing a first rough time synchronization and then improving the first rough time synchronization through averaging the results of this first rough time synchronization. So, in WO 01/91393 A2, a second fine time synchronization depends on and uses the results of the first rough one, and WO 01/91393 A2 does not disclose a two-step time synchronization based on different correlations.

A first embodiment of the receiver according to the invention is defined by the synchronization stage comprising a third part for performing a coarse frequency synchronization through detecting and accumulating phases of samples of a yet further group of preamble symbols. This third part performs a coarse frequency synchronization in an efficient and simple manner.

A second embodiment of the receiver according to the invention is defined by the yet further group of preamble symbols being situated between the group of preamble symbols and the further group of preamble symbols. As a result, firstly the coarse time synchronization is performed, secondly the coarse frequency synchronization is performed, and thirdly the fine time synchronization is performed.

A third embodiment of the receiver according to the invention is defined by the third part being adapted to perform a fine frequency synchronization through detecting and accumulating phases of samples of another group of preamble symbols following the further group of preamble symbols. The third part also performs a fine frequency synchronization in an efficient and simple manner and after the fine time synchronization has been performed and is advantageously used for both frequency synchronizations.

A fourth embodiment of the receiver according to the invention is defined by the processing stage comprising a fourth part for performing an automatic gain control after the coarse time synchronization and before the coarse frequency synchronization. This fourth part allows the automatic gain control to be performed digitally, which is an advantage compared to performing the automatic gain control in an analogue way. This is possible due to the receiver according to the invention having sufficient time between the coarse time synchronization and the coarse frequency synchronization to perform this automatic gain control. The fact that there is sufficient time directly results from the efficient and independent two-step time synchronization, which allows the coarse time synchronization to be very short.

A fifth embodiment of the receiver according to the invention is defined by the processing stage comprising
- a mixing unit for converting the frequency signals into the baseband signals; and
- a transformating unit coupled to an output of the mixing unit for processing the baseband signals;
with the synchronization stage comprising
- a buffering unit coupled to the output of the mixing unit for buffering at least a part of the baseband signals; and
- a controlling unit coupled to control inputs of the mixing unit and the transformating unit for controlling the mixing unit and the transformating unit;
with inputs of the first part and the second part being coupled to an output of the buffering unit and with an output of the first part being coupled to a first input of the controlling unit and with an output of the second part being coupled to a second input of the controlling unit. The processing stage for example further comprises an analog-to-digital converter and an equaliser, with the mixing unit for example comprising a digital mixer coupled to the analog-to-digital converter and with the transformating unit comprising a fast-fourier-transformer coupled to the equaliser. The buffering unit for example comprises a buffer.

A sixth embodiment of the receiver according to the invention is defined by the first part comprising an autocorrelating unit coupled to the input of the first part, an integrating unit coupled to an output of the autocorrelating unit, a first delaying unit coupled to an output of the integrating unit, a scaling unit coupled to an output of the first delaying unit, a deciding unit coupled to outputs of the scaling unit and the integrating unit, a second delaying unit coupled to an output of the deciding unit, and logical units situated between an output of the second delaying unit and the output of the first part. The autocorrelating unit for example comprises an autocorrelator for calculating an absolute value of an autocorrelation on samples of a group of preamble symbols over a length of a number of samples and over a distance of the number of samples, based upon the fact that in the group of preamble symbols each preamble symbol comprises the same samples. The integrating unit for example comprises an integrator for performing an envelope detection, the first delaying unit for example comprises a first delay line for delaying the envelope with a delay for example equal to twice the number of samples, the scaling unit for example comprises a multiplier for upscaling the envelope (multiplying the envelope with a multiplication factor), the deciding unit for example comprises a comparator for comparing the envelope with the delayed and upscaled version of itself, the second delaying unit for example comprises a second delay line like for example a shift register for delaying comparator signals and having a length of for example the number of samples, and the logical units for example comprise a number (equal to the number of samples) of EXOR gates for combining the comparator signals with a pattern and for generating combination signals and a number (equal to the number of samples) of AND gates for combining the combination signals with a mask. The number of samples is for example equal to sixteen, with ten short preamble symbols each comprising the same sixteen samples, with two long preamble symbols or training symbols each comprising the same sixty four samples, and with one guard interval preamble symbol comprising thirty two samples for separating the short preamble symbols and the training symbols and being identical to the last thirty two samples of each training symbol.

A seventh embodiment of the receiver according to the invention is defined by a third part for performing a coarse frequency synchronization and for performing a fine frequency synchronization comprising a phase detecting unit coupled to the output of the autocorrelating unit and a phase accumulating unit coupled to an output of the phase detecting unit, with an output of the phase accumulating unit being coupled to a third input of the controlling unit. The phase detecting unit for example comprises a phase detector and the phase accumulating unit for example comprises a phase accumulator for firstly performing the coarse frequency synchronization through detecting and accumulating phases between samples at a distance of for example the number of samples and secondly performing the fine frequency synchronization through detecting and accumulating phases between samples at a distance of for example four times the number of samples.

An eighth embodiment of the receiver according to the invention is defined by the second part comprising a crosscorrelating unit coupled to the input of the second part, an absolute value unit coupled to an output of the crosscorrelating unit, an integrating unit coupled to the input of the second part, a scaling unit coupled to an output of the integrating unit, a deciding unit coupled to outputs of the absolute value unit and the scaling unit, with an output of the deciding unit being coupled to the output of the second part. The crosscorrelating unit for example comprises a crosscorrelator for calculating a crosscorrelation on samples of a further group of preamble symbols by using the first twenty four samples of the guard interval preamble symbol as predefined samples and crosscorrelating these predefined samples with the samples of the further group of preamble symbols, and the absolute value unit generates the absolute value of this crosscorrelation. The integrating unit for example comprises a sliding window integrator for computing an average value of the samples of the further group of preamble symbols, the scaling unit for example comprises a multiplier for scaling the computed average value (multiplying the computed average value with a multiplication factor) for generating a threshold value, and the deciding unit for example comprises a comparator for comparing the absolute value of the crosscorrelation with the scaled average value or threshold value for detecting three peaks: the first peak corresponds with the twenty fourth sample of the guard interval preamble symbol, and the second and third peak correspond with the training symbols. Each data symbol comprises a guard interval data symbol and data. The first peak or the twenty fourth sample of the guard interval preamble symbol corresponds with the middle of the guard interval data symbol, and results in a fine time synchronization with an accuracy of exactly one sample.

The system according to the invention comprises the receiver according to the invention and a processor, and for example is a desktop computer, a laptop computer or a handheld computer, or a mobile phone or a terminal for audio and/or video etc., and further comprises for example a man-machine-interface like a display, a loudspeaker, a microphone, a keyboard and/or a remote control etc.

Embodiments of the system according to the invention and of the synchronization stage according to the invention and of the method according to the invention and of the processor program product according to the invention correspond with the embodiments of the receiver according to the invention.

The invention is based upon an insight, inter alia, that the accuracy of a one-step time synchronization can be improved by introducing one or more further time synchronization steps, with the steps preferably being independent from each other, and is based upon a basic idea, inter alia, that a coarse time synchronization is to be performed through autocorrelating samples of a group of preamble symbols and a fine time synchronization is to be performed through crosscorrelating samples of a further group of preamble symbols with predefined samples.

The invention solves the problem, inter alia, of providing a receiver having a relatively accurate time synchronization, and is advantageous, inter alia, in that the receiver according to the invention is more reliable.

These and other aspects of the invention will be apparent from and elucidated with reference to the embodiments(s) described hereinafter.

Figure 1:
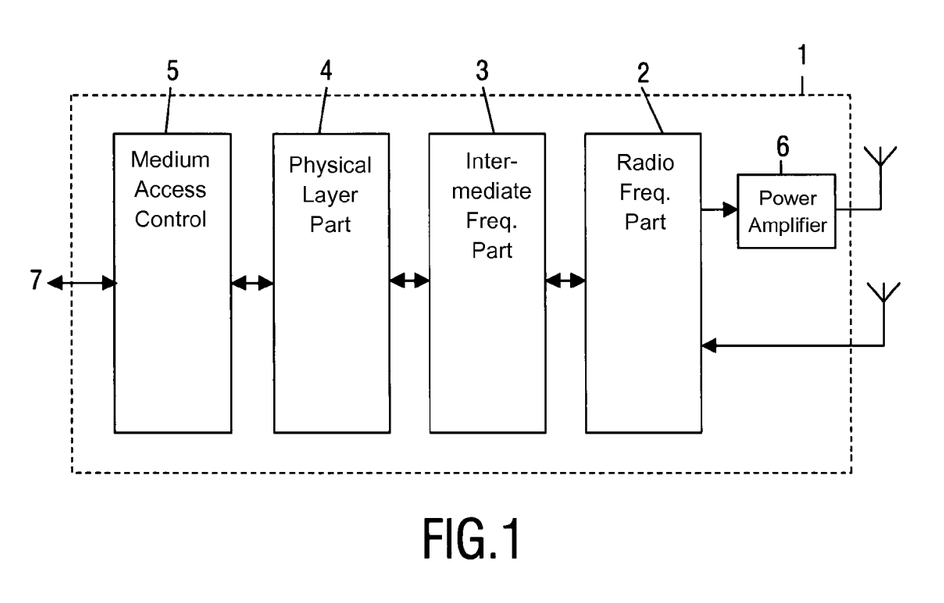
FIG. 1 shows in block diagram form a receiver according to the invention.

The receiver 1 according to the invention shown in FIG. 1, like for example a (part of a) wireless modem, a (part of a)

wireless interface for wireless networks like local area networks (IEEE 802.11a Wireless LAN) etc., comprises a serial circuit of a radio frequency part 2, an intermediate frequency part 3, a physical layer part 4 and a medium access control part 5. Medium access control part 5 is coupled via an in/output 7 to further equipment like for example a computer or a man-machine-interface etc. Radio frequency part 2 comprises a receiving part coupled to a receiving antenna. Radio frequency part 2 converts radio frequency signals into intermediate frequency signals, intermediate frequency part 3 converts intermediate frequency signals into baseband signals, physical layer part 4 demodulates baseband signals and medium access control part 5 forms an interface for the further equipment. In case of receiver 1 being a transceiver, radio frequency part 2 further comprises a transmitting part coupled via a power amplifier 6 to a transmitting antenna. Then, radio frequency part 2 also converts intermediate frequency signals into radio frequency signals, intermediate frequency part 3 also converts baseband signals into intermediate frequency signals, and physical layer part 4 also modulates baseband signals etc.

Figure 2:
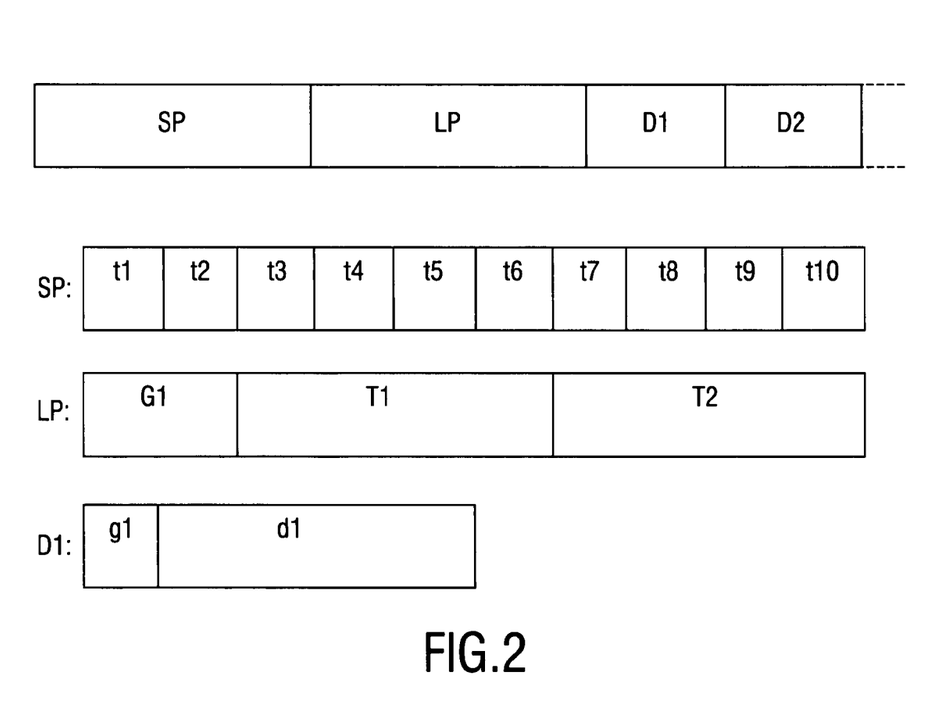
FIG. 2 shows a frame of baseband signals comprising preamble symbols and data symbols.

The frame of baseband signals shown in FIG. 2 comprises short preamble symbols SP and long preamble symbols LP and data symbols D1,D2 etc. The short preamble symbols SP comprise ten equal short preamble signals t1-t10 each having a duration of 0.8 μsec. and each comprising the same sixteen samples. The long preamble signals LP comprise a guard interval preamble symbol G1 having a duration of 1.6 μsec. and comprising thirty two samples and two training symbols T1,T2 each having a duration of 3.2 μsec. and each comprising the same sixty four samples. The thirty two samples of guard interval preamble symbol G1 are identical to the last thirty two samples of each training symbol T1,T2. Each data symbol D1,D2 comprises a guard interval data symbol having a duration of 0.8 μsec. and comprising sixteen samples, followed by data having a duration of 3.2 μsec. and comprising sixty four samples. The number of data symbols D1,D2 may vary.

Figure 3:
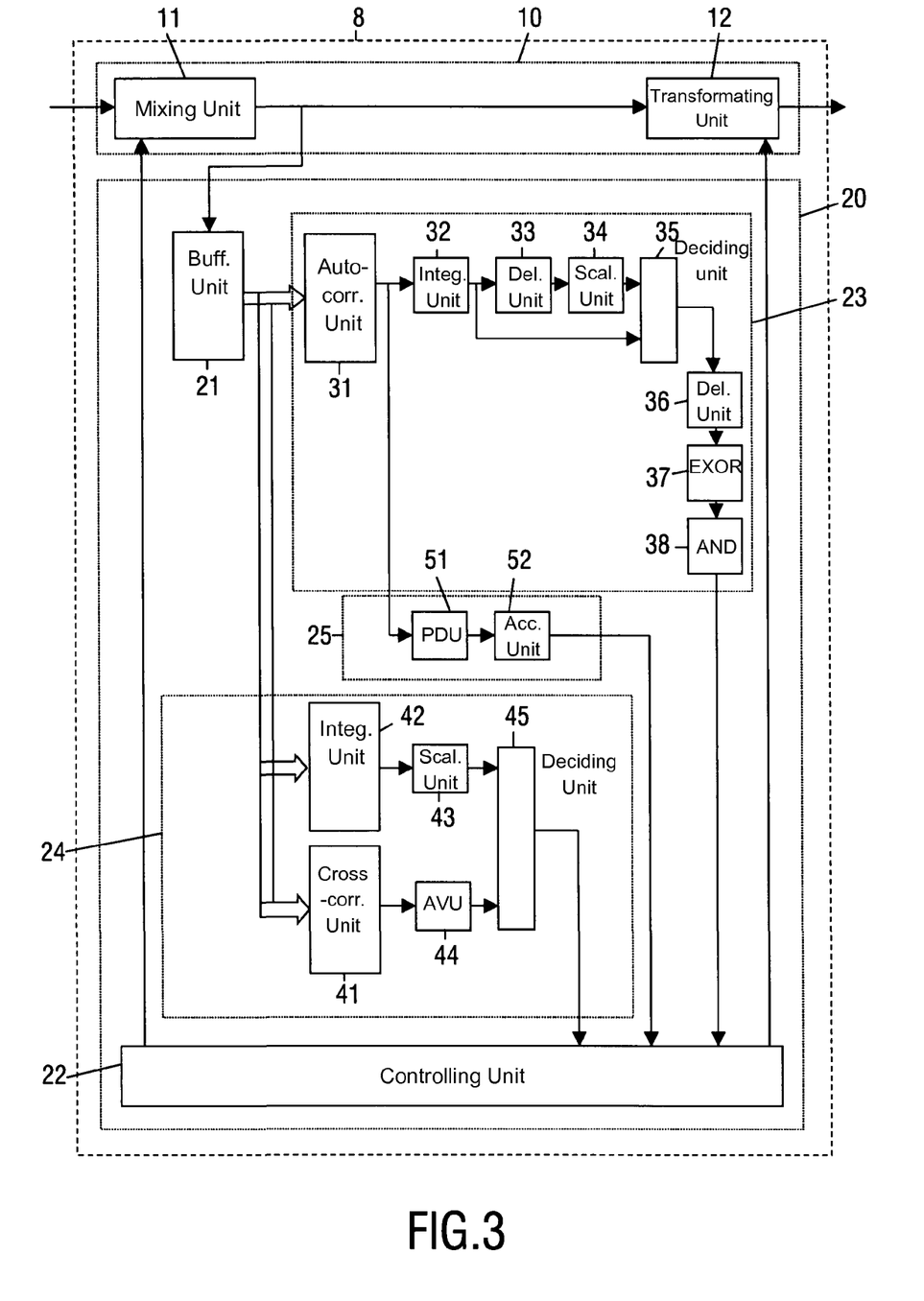
FIG. 3 shows in block diagram form a processing stage and a synchronization stage according to the invention.

The processing stage 10 and the synchronization stage 20 according to the invention shown in FIG. 3 together form a part 8, which corresponds with (one or more parts of) radio frequency part 2 and/or (one or more parts of) intermediate frequency part 3 and/or (one or more parts of) physical layer part 4. The processing stage 10 comprises a mixing unit 11 for example comprising an analog-to-digital converter and a digital mixer, and comprises a transformating unit 12 for example comprising a fast-fourier-transformer and an equaliser etc. The synchronization stage 20 comprises a buffering unit 21 like for example a buffer, and a controlling unit 22, and a first part 23, a second part 24 and a third part 25. The mixing unit 11 converts frequency signals into baseband signals. Thereto, either mixing unit 11 comprises a first mixer for converting the radio frequency signals into the intermediate frequency signals and a second mixer for converting the intermediate frequency signals into the baseband signals, or the mixing unit 11 converts the radio frequency signals into the baseband signals. Alternatively, another mixing unit not shown and located before the mixing unit 11 converts the radio frequency signals into the intermediate frequency signals etc. The transformating unit 12 is coupled to an output of the mixing unit 11 for processing the baseband signals. The buffering unit 21 is coupled to the output of the mixing unit 11 for buffering at least a part of the baseband signals, and the controlling unit 22 is coupled to control inputs of the mixing unit 11 and the transformating unit 12 for controlling the mixing unit 11 and the transformating unit 12. Inputs of the first part 23 and the second part 24 are coupled to an output of the buffering unit 22 and an output of the first part 23 is coupled to a first input of the controlling unit 22 and an output of the second part 24 is coupled to a second input of the controlling unit 22.

The first part 23 comprises an autocorrelating unit 31 coupled to the input of the first part 23, an integrating unit 32 coupled to an output of the autocorrelating unit 31, a first delaying unit 33 coupled to an output of the integrating unit 32, a scaling unit 34 coupled to an output of the first delaying unit 33, a deciding unit 35 coupled to outputs of the scaling unit 34 and the integrating unit 32, a second delaying unit 36 coupled to an output of the deciding unit 35, and logical units 37,38 situated between an output of the second delaying unit 36 and the output of the first part 23. The autocorrelating unit 31 for example comprises an autocorrelator for calculating an absolute value of an autocorrelation on samples of a group of preamble symbols t1,t2,t3 over a length of sixteen samples and over a distance of sixteen samples, based upon the fact that in the group of preamble symbols t1,t2,t3 each preamble symbol comprises the same sixteen samples. The integrating unit 32 for example comprises an integrator for performing an envelope detection, the first delaying unit 33 for example comprises a first delay line for delaying the envelope with a delay for example equal to thirty two samples, the scaling unit 34 for example comprises a multiplier for upscaling the envelope (multiplying the envelope with a multiplication factor), the deciding unit 35 for example comprises a comparator for comparing the envelope with the delayed and upscaled version of itself, the second delaying unit 36 for example comprises a second delay line like for example a shift register for delaying comparator signals and having a length of for example sixteen, and the logical units 37,38 for example comprise sixteen EXOR gates 37 for combining sixteen comparator signals with a sixteen-bit pattern and for generating sixteen combination signals and sixteen AND gates 38 for combining the sixteen combination signals with a sixteen-bit mask.

The autocorrelation AC(n,16) is for example:

AC(n,16)=SUM from k=0 to k=15 of {In(n−k)In*(n−k−16)}, with n being the $n^{th}$ sample and with In being the incoming signal arriving via the buffer. The integrator has a programmable speed and a programmable minimum value, the first delay line has an adjustable delay, the multiplier has an adjustable multiplication factor, and the pattern and the mask are flexible, to make the coarse time synchronization as flexible as possible and to create resistance against misdetections. The autocorrelator is more reliable than a crosscorrelator in case of frequency offset and/or channel distorsion being present. The envelope detection make the coarse time synchronization less sensitive to short term amplitude variations in the autocorrelation output. The scaled envelope detection makes the coarse time synchronization independent from the level of the baseband signals, and the scaled and/or delayed envelope detection allows to tune the sensitivity of the envelope detection.

The second part 24 comprises a crosscorrelating unit 41 coupled to the input of the second part 24, an absolute value unit 44 coupled to an output of the crosscorrelating unit 41, an integrating unit 42 coupled to the input of the second part 24, a scaling unit 43 coupled to an output of the integrating unit 42, a deciding unit 45 coupled to outputs of the absolute value unit 44 and the scaling unit 43, with an output of the deciding unit 45 being coupled to the output of the second part 24. The crosscorrelating unit 41 for example comprises a crosscorrelator for calculating a crosscorrelation on samples of a further group of preamble symbols t10,G1 by using the first twenty four samples of the guard interval preamble symbol G1 as predefined samples and crosscorrelating these predefined samples with the samples of the further group of preamble symbols t10,G1, and the absolute value unit 44 generates the absolute value of this crosscorrelation. The integrating unit 42 for example comprises a sliding window integrator for computing an average value of the samples of the further group of preamble symbols t10,G1, the scaling unit 43 for example comprises a multiplier for scaling the computed average value (multiplying the computed average value with a multiplication factor) for generating a threshold value, and the deciding unit 45 for example comprises a comparator for comparing the absolute value of the crosscorrelation with the scaled average value or threshold value for detecting three peaks: the first peak corresponds with the twenty fourth sample of the guard interval preamble symbol G1, and the second and third peak correspond with the training symbols T1,T2. Each data symbol D1 comprises a guard interval data symbol g1 and data d1. The first peak or the twenty fourth sample of the guard interval preamble symbol G1 corresponds with the middle of the guard interval data symbol g1, and results in a fine time synchronization with an accuracy of exactly one sample.

The crosscorrelation CC(n) is for example:

CC(n)=SUM from k=0 to k=23 of {In(n−k)REF C*(k)}, with n being the $n^{th}$ sample and with In being the incoming signal arriving via the buffer and with REF C*(k) being the first twenty four samples of guard interval preamble symbol G1. The sliding window integration SI(n,L) is for example:

SI(n,L)=1/L·SUM from k=0 to k=L−1 of {Abs In(n−k)}, with n being the $n^{th}$ sample and with In being the incoming signal arriving via the buffer and with L being the length of the sliding window and with Abs In(n−k) being the absolute value of In(n−k). The integrator has a flexible sliding window length, and the multiplier has an adjustable multiplication factor, to make the fine time synchronization as flexible as possible. The crosscorrelation with predefined samples results in an exact match on the detection moment, and the creation of the threshold value from the baseband signals itself makes the fine time synchronization independent from the level of the baseband signals.

The third part 25 for performing a coarse frequency synchronization and for performing a fine frequency synchronization comprises a phase detecting unit 51 coupled to the output of the autocorrelating unit 31 and a phase accumulating unit 52 coupled to an output of the phase detecting unit 51, with an output of the phase accumulating unit 52 being coupled to a third input of the controlling unit 22. The phase detecting unit 51 for example comprises a phase detector and the phase accumulating unit 52 for example comprises a phase accumulator for firstly performing the coarse frequency synchronization through detecting and accumulating phases between samples at a distance of for example sixteen samples (of a yet further group of preamble symbols t8,t9) and secondly performing the fine frequency synchronization through detecting and accumulating phases between samples at a distance of for example sixty four samples (of another group of preamble symbols T1,T2).

If a coarse frequency error exists between a transmitter and the receiver according to the invention, this coarse frequency error results in an incremental phase rotation on the subsequent samples. The phase difference between two samples with a distance of sixteen samples is therefore a measure of the coarse frequency error. By using the phases coming from the autocorrelator, an averaged measure of the coarse frequency error is obtained. The summation in the autocorrelation provides the averaging to reduce the impact of noise on the error estimation. The use of the autocorrelator results in the fact that the phase difference between samples with a relatively small amplitude will have less impact on the final phase. Samples with a large amplitude will have more impact. In the coarse frequency synchronization, the coarse frequency error CFE is for example:

$$CFE=Arg(AC(n,16))/(2\cdot\pi\cdot 800e-9), \text{ with}$$

Arg(AC(n,16))=Arg(SUM from k=0 to k=15 of {In(n−k) In*(n−k−16)}), with n being the $n^{th}$ sample and with In being the incoming signal arriving via the buffer and with 800e-9 being the 0.8 μsec. This averaged coarse frequency error can be accumulated and further averaged to improve the frequency accuracy. As a result, by computing the phase difference between two samples at a distance of sixteen samples, a large detection range is got, without a fine time synchronization being required.

If a fine frequency error exists between a transmitter and the receiver according to the invention, this fine frequency error results in an incremental phase rotation on the subsequent samples. The fine frequency synchronization uses the fact that both training symbols T1,T2 are transmitted as identical symbols. The phase difference between two samples with a distance of sixty four samples is therefore a measure of the fine frequency error. By using the phases coming from the autocorrelator (now programmed to a distance equal to sixty four samples), an averaged measure of the fine frequency error is obtained. The summation in the autocorrelation provides the averaging to provide to reduce the impact of noise on the error estimation. In the fine frequency synchronization, the fine frequency error FFE is for example:

$$FFE=Arg(AC(n,64))/(2\cdot\pi\cdot 3200e-9), \text{ with}$$

Arg(AC(n,64))=Arg (SUM from k=0 to k=15 of {In(n−k) In*(n−k−64)}), with n being the $n^{th}$ sample and with In being the incoming signal arriving via the buffer and with 3200e-9 being the 3.2 μsec. Buffering unit 21 should be able to buffer at least 16+64=80 samples, preferably for example 81 samples. This averaged fine frequency error can be accumulated and further averaged to improve the frequency accuracy. As a result, by computing the phase difference between two samples at a distance of sixty four samples, a smaller detection range is got, with a higher resolution and less sensitivity to noise being the advantageous result.

The processing stage may comprise a fourth part not shown and for example located in transformating unit 12 and controlled by controlling unit 22 for performing an automatic gain control after the coarse time synchronization and before the coarse frequency synchronization, in other words for example during (a receival of) the preamble symbols t4,t5,t6, t7. This fourth part allows the automatic gain control to be performed digitally, which is an advantage compared to performing the automatic gain control in an analogue way. The performance of the automatic gain control after the coarse time synchronization and before the coarse frequency synchronization is possible due to the receiver 1 according to the invention having sufficient time between the coarse time synchronization and the coarse frequency synchronization to perform this automatic gain control.

The use of the autocorrelator for coarse time synchronization as well as for coarse and fine frequency synchronization is efficient advantageously. Although the four groups of preamble symbols as described before do not have any overlappings, in practice, they may have some overlappings. Further, each one of these four groups of preamble symbols may comprise entire preamble symbols and/or parts (some samples) of preamble symbols. Each block of parts 23,24,25 may be coupled to controlling unit 22 via a coupling not shown for controlling and/or adjusting the block.

Figure 4:
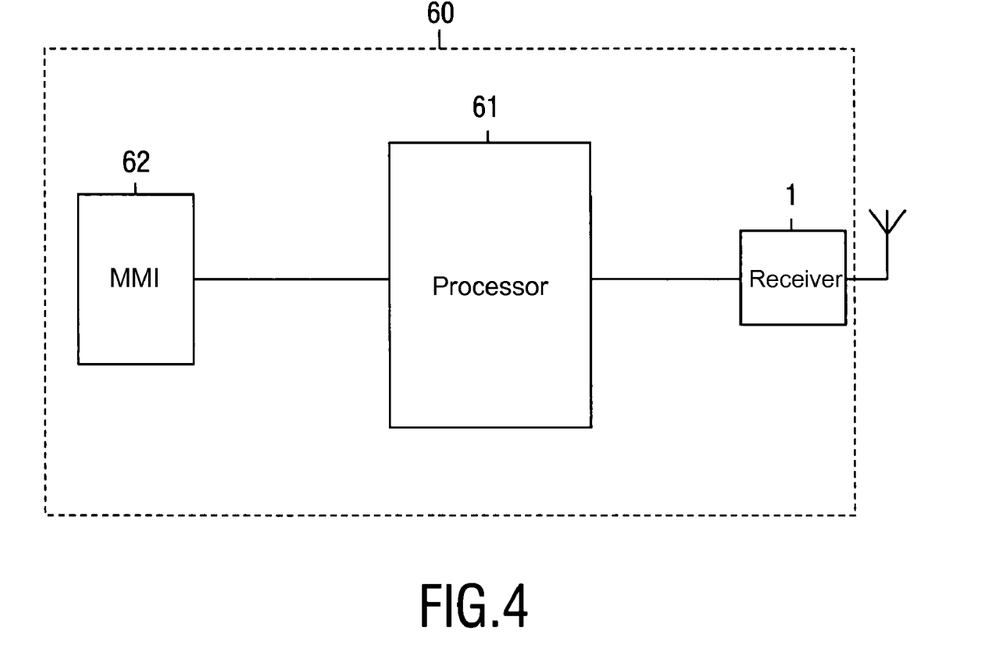
FIG. 4 shows in block diagram form a system according to the invention comprising a receiver according to the invention.

The system 60 according to the invention shown in FIG. 4, like for example a desktop computer, a laptop computer or a handheld computer, or a mobile phone or a terminal for audio and/or video etc., comprises a receiver 1 according to the invention as shown in FIG. 1 and a processor 61 coupled to receiver 1 and a man-machine-interface 62 or mmi 62 coupled to processor 61. Mmi 62 for example comprises a display, a loudspeaker, a microphone, a keyboard and/or a remote control etc.

The expression "for" in for example "for A" and "for B" does not exclude that other functions "for C" are performed as well, simultaneously or not. The expressions "X coupled to Y" and "a coupling between X and Y" and "coupling/couples X and Y" etc. do not exclude that an element Z is in between X and Y. The expressions "P comprises Q" and "P comprising Q" etc. do not exclude that an element R is comprised/included as well.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention is based upon an insight, inter alia, that the accuracy of a one-step time synchronization can be improved by introducing one or more further time synchronization steps, with the steps preferably being independent from each other, and is based upon a basic idea, inter alia, that a coarse time synchronization is to be performed through autocorrelating samples of a group of preamble symbols and a fine time synchronization is to be performed through crosscorrelating samples of a further group of preamble symbols with predefined samples.

The invention solves the problem, inter alia, of providing a receiver having a relatively accurate time synchronization, and is advantageous, inter alia, in that the receiver according to the invention is more reliable.

The invention claimed is:

1. Receiver for receiving frequency signals, the receiver comprising:
    a processing stage for converting the frequency signals into baseband signals comprising preamble symbols and data symbols and for processing the baseband signals; and
    a synchronization stage for synchronising the processing stage and comprising a first part for performing a coarse time synchronization and a second part for performing a fine time synchronization, wherein the first part comprises an autocorrelating unit for autocorrelating samples of a group of preamble symbols, wherein the second part comprises a crosscorrelating unit for crosscorrelating samples of a further group of preamble symbols with predefined samples, and wherein the result of the autocorrelating the samples of the group of preamble symbols by the autocorrelating unit is not used by the crosscorrelating unit for the crosscorrelating the samples of the further group of preamble symbols with the predefined samples.

2. Receiver according to claim 1, wherein the synchronization stage comprises a third part for performing a coarse frequency synchronization through detecting and accumulating phases of samples of a yet further group of preamble symbols.

3. Receiver according to claim 2, wherein the yet further group of preamble symbols is situated between the group of preamble symbols and the further group of preamble symbols.

4. Receiver according to claim 3, wherein the third part is configured to perform a fine frequency synchronization through detecting and accumulating phases of samples of another group of preamble symbols following the further group of preamble symbols.

5. Receiver according to claim 2, wherein the processing stage comprises a fourth part for performing an automatic gain control after the coarse time synchronization and before the coarse frequency synchronization.

6. Receiver according to claim 1, wherein the processing stage comprises:
    a mixing unit for converting the frequency signals into the baseband signals; and
    a transformating unit coupled to an output of the mixing unit for processing the baseband signals;
    with the synchronization stage comprising
    a buffering unit coupled to the output of the mixing unit for buffering at least a part of the baseband signals; and
    a controlling unit coupled to control inputs of the mixing unit and the transformating unit for controlling the mixing unit and the transformating unit;
    with inputs of the first part and the second part being coupled to an output of the buffering unit and with an output of the first part being coupled to a first input of the controlling unit and with an output of the second part being coupled to a second input of the controlling unit.

7. Receiver according to claim 6, wherein the autocorrelating unit is coupled to the input of the first part, and wherein the first part further comprises an integrating unit coupled to an output of the autocorrelating unit, a first delaying unit coupled to an output of the integrating unit, a scaling unit coupled to an output of the first delaying unit, a deciding unit coupled to outputs of the scaling unit and the integrating unit, a second delaying unit coupled to an output of the deciding unit, and logical units situated between an output of the second delaying unit and the output of the first part.

8. Receiver according to claim 7, wherein a third part for performing a coarse frequency synchronization and for performing a fine frequency synchronization comprises a phase detecting unit coupled to the output of the autocorrelating unit and a phase accumulating unit coupled to an output of the phase detecting unit, with an output of the phase accumulating unit being coupled to a third input of the controlling unit.

9. Receiver according to claim 6, wherein the crosscorrelating unit is coupled to the input of the second part, and wherein the second part further comprises an absolute value unit coupled to an output of the crosscorrelating unit, an integrating unit coupled to the input of the second part, a scaling unit coupled to an output of the integrating unit, a deciding unit coupled to outputs of the absolute value unit and the scaling unit, with an output of the deciding unit being coupled to the output of the second part.

10. System comprising a processor and a receiver for receiving frequency signals, the receiver comprising:
- a processing stage for converting the frequency signals into baseband signals comprising preamble symbols and data symbols and for processing the baseband signals; and
- a synchronization stage for synchronising the processing stage and comprising a first part for performing a coarse time synchronization and a second part for performing a fine time synchronization, wherein the first part comprises an autocorrelating unit for autocorrelating samples of a group of preamble symbols, wherein the second part comprises a crosscorrelating unit for crosscorrelating samples of a further group of preamble symbols with predefined samples, and wherein the result of the autocorrelating the samples of the group of preamble symbols by the autocorrelating unit is not used by the crosscorrelating unit for the crosscorrelating the samples of the further group of preamble symbols with the predefined samples.

11. Synchronisation stage for use in a receiver for receiving frequency signals, the receiver comprising:
- a processing stage for converting the frequency signals into baseband signals comprising preamble symbols and data symbols and for processing the baseband signals; and
- the synchronization stage for synchronising the processing stage and comprising a first part for performing a coarse time synchronization and a second part for performing a fine time synchronization, wherein the first part comprises an autocorrelating unit for autocorrelating samples of a group of preamble symbols, wherein the second part comprises a crosscorrelating unit for crosscorrelating samples of a further group of preamble symbols with predefined samples, and wherein the result of the autocorrelating the samples of the group of preamble symbols by the autocorrelating unit is not used by the crosscorrelating unit for the crosscorrelating the samples of the further group of preamble symbols with the predefined samples.

12. Method for receiving frequency signals, the method comprising:
- converting the frequency signals into baseband signals comprising preamble symbols and data symbols and processing the baseband signals; and
- synchronising the converting and/or the processing via performing a coarse time synchronization and via performing a fine time synchronization, wherein the performing the coarse time synchronization comprises autocorrelating samples of a group of preamble symbols, wherein the performing the fine time synchronization comprises crosscorrelating samples of a further group of preamble symbols with predefined samples, and wherein the result of the autocorrelating the samples of the group of preamble symbols is not used for the crosscorrelating the samples of the further group of preamble symbols with the predefined samples.

13. Processor program product for receiving frequency signals, the processor program product comprising:
- converting the frequency signals into baseband signals comprising preamble symbols and data symbols and processing the baseband signals; and
- synchronising the converting and/or the processing via performing a coarse time synchronization and via performing a fine time synchronization, wherein the performing the coarse time synchronization comprises autocorrelating samples of a group of preamble symbols, wherein the performing the fine time synchronization comprises crosscorrelating samples of a further group of preamble symbols with predefined samples, and wherein the result of the autocorrelating the samples of the group of preamble symbols is not used for the crosscorrelating the samples of the further group of preamble symbols with the predefined samples.

14. Receiver according to claim 1, wherein the further group of preamble symbols comprises a short preamble symbol and a long preamble symbol.

15. Receiver according to claim 14, wherein the long preamble symbol is a guard interval preamble symbol.

16. Receiver according to claim 15, wherein the crosscorrelating unit comprises a crosscorrelator configured to use samples of the guard interval preamble symbol as the predefined samples and to crosscorrelate the predefined samples with the samples of the further group of preamble symbols.

17. Receiver according to claim 1, wherein the first part is configured to perform the coarse time synchronization independently from the level of the baseband signals.

18. Receiver according to claim 7, wherein the integrating unit comprises an integrator configured to perform an envelope detection on the result of the autocorrelating unit.

19. Receiver according to claim 18, wherein the first delaying unit comprises a first delay line configured to delay the envelope of the envelope detection to generate a delayed envelope, the scaling unit comprises a multiplier configured to multiply the delayed envelope with a multiplication factor to generate a multiplied and delayed envelope, and the deciding unit comprises a comparator configured to compare the envelope of the envelope detection with the multiplied and delayed envelope.

20. Receiver according to claim 9, wherein the integrating unit comprises a sliding window integrator configured to generate an average value of the samples of the further group of preamble symbols and the scaling unit comprises a multiplier configured to multiply the average value of the samples of the further group of preamble symbols with a multiplication factor to generate a threshold value for the deciding unit.

* * * * *